(12) United States Patent
Yamaguchi et al.

(10) Patent No.: US 7,520,349 B2
(45) Date of Patent: Apr. 21, 2009

(54) CONTROL APPARATUS AND CONTROL METHOD OF VEHICLE

(75) Inventors: Katsuhiko Yamaguchi, Nissin (JP); Osamu Harada, Toyota (JP); Yukio Kobayashi, Kasugai (JP); Kiyoshiro Ueoka, Nissin (JP); Kazuhiro Ichimoto, Nissin (JP); Takahiro Nishigaki, Nagoya (JP); Makoto Yamazaki, Susono (JP); Mamoru Tomatsuri, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 510 days.

(21) Appl. No.: 10/565,303

(22) PCT Filed: May 24, 2004

(86) PCT No.: PCT/JP2004/007528

§ 371 (c)(1),
(2), (4) Date: Jan. 20, 2006

(87) PCT Pub. No.: WO2005/012023

PCT Pub. Date: Feb. 10, 2005

(65) Prior Publication Data

US 2006/0180362 A1 Aug. 17, 2006

(30) Foreign Application Priority Data

Jul. 30, 2003 (JP) .............................. 2003-203964

(51) Int. Cl.
*B60K 6/00* (2007.10)

(52) U.S. Cl. ...................................... 180/65.2; 180/65.3
(58) Field of Classification Search ................ 180/65.2, 180/65.3, 65.6
See application file for complete search history.

(56) References Cited

U.S. PATENT DOCUMENTS

| 5,323,868 | A | | 6/1994 | Kawashima |
| 5,566,774 | A | | 10/1996 | Yoshida |
| 6,059,057 | A | * | 5/2000 | Yamazaki et al. .......... 180/65.2 |
| 6,343,252 | B1 | | 1/2002 | Asami et al. |
| 6,427,793 | B1 | | 8/2002 | Hanada et al. |
| 6,719,076 | B1 | * | 4/2004 | Tabata et al. ................ 180/65.7 |
| 6,892,541 | B2 | * | 5/2005 | Suzuki ......................... 60/706 |
| 6,895,744 | B2 | * | 5/2005 | Osawa .......................... 60/277 |
| 7,007,464 | B1 | * | 3/2006 | Asami et al. .................. 60/300 |
| 7,121,084 | B2 | * | 10/2006 | Miyashita .................... 60/285 |

FOREIGN PATENT DOCUMENTS

| DE | 692 01 094 T2 | 5/1995 |
| DE | 100 38 947 A1 | 3/2001 |
| DE | 100 41 535 A1 | 3/2001 |
| DE | 100 41 538 A1 | 4/2001 |
| EP | 0 511 654 A2 | 11/1992 |

(Continued)

*Primary Examiner*—Christopher P Ellis
*Assistant Examiner*—Brian Swenson
(74) *Attorney, Agent, or Firm*—Oliff & Berridge, PLC

(57) ABSTRACT

A control method of a vehicle includes a step of running the vehicle in an EV running mode in accordance with an operation of a driver, a step of performing a warming-up running, when it is determined that warming up is required, and a step of prohibiting the EV running mode such that the warming up running can be performed.

6 Claims, 4 Drawing Sheets

FOREIGN PATENT DOCUMENTS

| | | |
|---|---|---|
| EP | 1 063 120 A2 | 12/2000 |
| EP | 1 223 323 A2 | 7/2002 |
| JP | U 5-21119 | 3/1993 |
| JP | A-5-222966 | 8/1993 |
| JP | A 7-71236 | 3/1995 |
| JP | A 9-327103 | 12/1997 |
| JP | A 10-271695 | 10/1998 |
| JP | A 11-22503 | 1/1999 |
| JP | A 11-075302 | 3/1999 |
| JP | A-2000-104588 | 4/2000 |
| JP | A 2001-132487 | 5/2001 |
| JP | A 2001-317384 | 11/2001 |
| JP | A 2003-23703 | 1/2003 |

\* cited by examiner

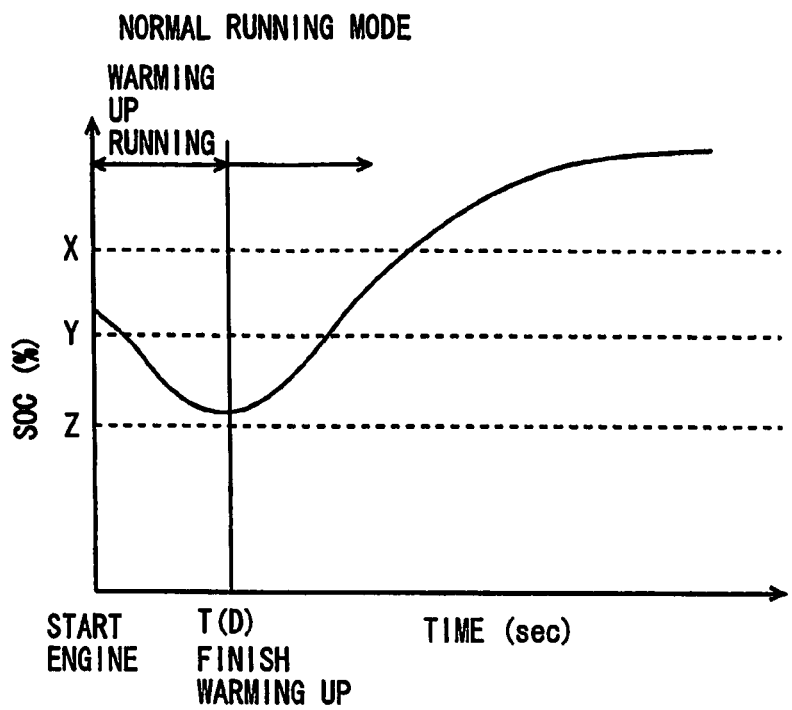
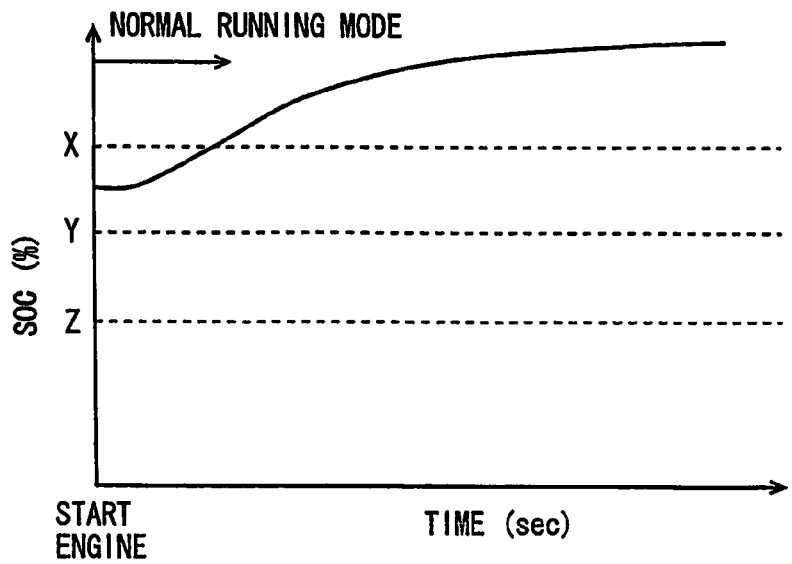

CONTROL APPARATUS AND CONTROL METHOD OF VEHICLE

TECHNICAL FIELD

The present invention relates to a control apparatus and a control method of a vehicle, and specifically, to a control apparatus and a control method of a vehicle in which the EV running mode, that is a mode for running a vehicle using an electric motor supplied with electric power from a charging mechanism, can be selected by a driver.

BACKGROUND ART

Conventionally, a vehicle that runs by drive power from at least one of an engine or a motor, i.e., a so-called hybrid vehicle, is known. The hybrid vehicle selectively uses the engine and the motor in accordance with the running state of the vehicle and the like, so as to make full use of their respective characteristics. One suggested hybrid vehicle allows a driver to select an EV running mode for stopping the engine and running the vehicle by the motor supplied with electric power from a battery. The engine is stopped and the vehicle does not produce any exhaust gases or noises of the engine during the EV running mode, and therefore it is particularly suitable for driving in a residential area late in the night or early in the morning.

Japanese Patent Laying-Open No. 11-75302 discloses a hybrid vehicle that can run also as an electric vehicle without operating an engine. The hybrid vehicle described in Japanese Patent Laying-Open No. 11-75302 includes: an internal combustion engine; a first electric generator directly coupled to the rotation shaft of the internal combustion engine; a transmission provided on the output side of the first electric generator through a first clutch; a transmission drive selectively setting the gear ratio of the transmission in accordance with an electric signal; a power connection gear coupled between the first clutch and the transmission; a second electric generator coupled to the power connection gear through a second clutch; a clutch drive jointing/disjointing the second clutch in accordance with an electric signal; an EV mode control unit performing acceleration or braking by the second electric generator with the first clutch disjointed; and a transmission control circuit electrically coupled to the EV mode control unit and providing a controlling electric signal to the transmission drive and the clutch drive in accordance with driving operation information.

The hybrid vehicle, when the charging amount of the charging cell reaches a predetermined value, prohibits the EV mode and starts the engine to rotate the first electric generator, whereby the first electric generator is driven as a generator to charge the charging cell. Here, the second electric generator is supplied with electric power from the charging cell, whereby the second electric generator is driven as an electric motor to run the vehicle.

When the charging amount of the charging cell becomes smaller than a predetermined value, the first and second electric generators are stopped and the engine is started, to run the vehicle by the drive power of the engine.

According to the hybrid vehicle described in the publication, in a hybrid vehicle that can be driven as an electric vehicle coupling the power connection gear, coupled between the transmission and the first clutch, and the second electric generator through the second clutch while not operating the internal combustion engine, control of the second clutch and the transmission can also be attained properly and automatically, and the speed can be changed by the transmission.

Japanese Patent Laying-Open No. 2003-23703 discloses a control apparatus of a hybrid vehicle that charges a battery just by the required amount when EV mode is requested to ensure driving in the EV mode. The control apparatus described in Japanese Patent Laying-Open No. 2003-23703 includes: a circuit to which a hybrid running mode, for running the vehicle by driving an electric motor while driving a generator by an engine, and an EV running mode, for running the vehicle by driving the motor only by electric power from a battery without driving the engine, are set; a mode switching circuit switching these running modes; an input circuit specifying the driving range by the EV running mode; a charging control circuit charging the battery to a charging amount required for driving in the EV running mode through the input EV running range; and a circuit enabling switching to the EV running mode when the battery is charged to a required amount.

According to the control apparatus of the hybrid vehicle described in the publication, when an EV running range is specified, the battery is charged just by the amount required for driving in the EV running mode through the running range. Therefore, the battery power will not fail or charged excessively during driving in the EV running mode. Thus, the battery is not increased in size and the EV running can surely be achieved.

As the engine is driven by combustion of fuel, the hybrid vehicle likewise emits exhaust gases, which necessitates a catalyst for purifying the exhaust gases. Additionally, the catalyst must be warmed up sufficiently in order to exert exhaust gas purifying effect. It is known that warming up to raise the temperature of the catalyst is necessary, for example, when starting up the engine that has been stopped for a long period.

However, the hybrid vehicle described in Japanese Patent Laying-Open No. 11-75302, when the charging amount of the charging cell reaches a predetermined value, prohibits the EV mode and starts the engine to rotate the first electric generator, whereby the first electric generator is driven as a generator to charge the charging cell. Here, the second electric generator is supplied with the stored electric power, whereby the second electric generator is driven as an electric motor to run the vehicle. Accordingly, the engine must be driven with the output that allows the second electric generator to be driven and electric power required for charging the charging cell to be generated, even during warming-up of the catalyst.

When the charging amount of the charging cell becomes smaller than the predetermined value, the first and second electric generators are stopped and the engine is started, to run the vehicle by the drive power of the engine. Accordingly, the engine must be driven with the output required for driving the vehicle, even during warming up of the catalyst.

In either case, exhaust gases may be emitted in an amount exceeding the purifying capability of the warming-up catalyst.

The hybrid vehicle described in Japanese Patent Laying-Open No. 2003-23703 permits the EV running only when the charging amount of the battery satisfies the charging amount required for driving in the EV running mode through the running range. Accordingly, when the catalyst is not warmed up, for example, after stopped for a long period, and the charging amount of the battery is not in the charging amount required for driving in the EV running mode through the running range, the EV running cannot be performed and it is necessary to start the engine for running the vehicle by the drive power of the engine. Accordingly, the engine must be driven with the output necessary for running the vehicle, even during warming up of the catalyst. Thus, exhaust gases may disadvantageously be emitted in an amount exceeding the purifying capability of the warming-up catalyst.

DISCLOSURE OF THE INVENTION

The present invention is made to solve the problems discussed above, and an object of the present invention is to provide a control apparatus and a control method of a vehicle preventing gas emission in an amount exceeding the purifying capability of a warming-up catalyst.

Another object of the present invention is to provide a control apparatus and a control method of a vehicle that allows a driver to recognize the state of a vehicle.

A control apparatus of a vehicle according to the present invention is a control apparatus of a vehicle equipped with an electric motor generating drive power, a charging mechanism supplying electric power to the electric motor, and a catalyst purifying gases emitted as the drive power of the vehicle is generated. The control apparatus includes: a first control unit running the vehicle by the electric motor supplied with electric power from the charging mechanism in accordance with the operation of a driver; a determination unit determining whether the catalyst requires to be warmed up or not; a second control unit running the vehicle by the electric motor supplied with electric power from the charging mechanism, when it is determined that the catalyst requires to be warmed up; and a prohibition unit prohibiting control by the first control unit based on a predetermined condition as to whether execution of control by the second control unit is possible or not.

According to the present invention, the first control unit runs the vehicle by the electric motor supplied with power from the charging mechanism in accordance with an operation of a driver (an EV running mode). Additionally, the second control unit runs the vehicle by the electric motor supplied with electric power from the charging mechanism, when it is determined that the catalyst requires to be warmed up (a warming-up running). Here, based on the predetermined condition as to whether execution of control by the second control unit (the warming-up running) is possible or not, control by the first control unit (the EV running mode) is prohibited. Thus, even when there is a request from the driver, control by the first control unit (the EV running mode) may be prohibited such that control by the second control unit (the warming-up running) can be executed. This prevents electric power stored in the charging mechanism from being consumed by control by the first control unit (the EV running mode) and hence prevents the remaining amount of the charging mechanism from becoming smaller than the remaining amount necessary for executing control by the second control unit (the warming-up running). Thus, control by the second control unit (the warming-up running) is ensured. Accordingly, in case of a hybrid vehicle equipped with an engine, an electric motor, and a charging mechanism, for example, the output of the engine is less consumed for running the vehicle during warming-up of the catalyst. Therefore, during the warming-up of the catalyst, the amount of gases (exhaust gases) produced by engine operation can be suppressed. Additionally, in case of a fuel cell vehicle equipped with a fuel cell, a reformer, and a catalyst purifying gases (specifically, CO) produced when taking hydrogen out by the reformer, for example, the electric power generated by the fuel cell is less consumed for running the vehicle during warming-up of the catalyst. Thus, the power generation amount of the fuel cell and the amount of hydrogen taken out by the reformer can be suppressed. Therefore, the amount of gases (specifically, CO) produced when taking hydrogen out can be suppressed. As a result, in either case, the control apparatus of a vehicle can be provided, in which gas emission in an amount exceeding the purifying capability of the warming-up catalyst is prevented.

Preferably, an engine generating drive power may be mounted on the vehicle, and the catalyst may purify gases emitted from the engine.

According to the present invention, the engine can also be utilized as source of drive power, and gases emitted from the engine can be purified by the catalyst.

Preferably, the predetermined condition is a condition that the remaining amount of the charging mechanism is smaller than a predetermined remaining amount.

According to the present invention, when the remaining amount of the charging mechanism is smaller than the predetermined remaining amount, the EV running mode can be prohibited.

Preferably, the control apparatus further includes an information unit for informing a driver that control by the fist control unit is prohibited, when control by the first control unit is prohibited.

According to the invention, when control by the first control unit (the EV running mode) is prohibited, the driver is informed of the same. Therefore, the control apparatus of a vehicle that allows the driver to recognize the state of the vehicle can be provided.

A control method of a vehicle according another aspect of the present invention is a control method of a vehicle equipped with an electric motor generating drive power, a charging mechanism supplying electric power to the electric motor, and a catalyst purifying gases emitted from the vehicle. The control method includes: a step of running the vehicle by the electric motor supplied with electric power from the charging mechanism in accordance with an operation of a driver; a step of determining whether the catalyst requires to be warmed up or not; a step of running the vehicle by the electric motor supplied with electric power from the charging mechanism, when it is determined that the catalyst requires to be warmed up; and a step of prohibiting control by the step of running the vehicle by the electric motor supplied with electric power from the charging mechanism in accordance with an operation of a driver based on a predetermined condition as to whether execution of control by the step of running the vehicle by the electric motor supplied with electric power from the charging mechanism when it is determined that the catalyst requires to be warmed up is possible or not.

According to the present invention, the vehicle runs by the electric motor supplied with electric power from the charging mechanism according to the operation of the driver (an EV running mode). The vehicle runs by the electric motor supplied with electric power from the charging mechanism, when it is determined that the catalyst requires to be warmed up (a warming-up running). Here, based on the predetermined condition as to whether execution of control by the step of running the vehicle when it is determined that the catalyst requires to be warmed up (the warming-up running) is possible or not, control by the step of running the vehicle in accordance with an operation of a driver (the EV running mode) is prohibited. Thus, even when there is a request from the driver, control by the step of running the vehicle in accordance with an operation of a driver (the EV running mode) may be prohibited such that control by the step of running the vehicle when it is determined that the catalyst requires to be warmed up (the warming-up running) can be executed. This prevents electric power stored in the charging mechanism from being consumed by control by the step of running the vehicle in accordance with an operation of a driver (the EV running mode) and hence it prevents the remaining amount of the charging mechanism from becoming smaller than the remaining amount necessary for executing control by the step of running the vehicle when it is determined that the catalyst requires to be warmed up (the warming-up running). Thus, control by the step of running the vehicle when it is determined that the catalyst requires to be warmed up (the warming-up running) is ensured. Accordingly, in case of a hybrid vehicle equipped with an engine, an electric motor, and a charging mechanism, for example, the output of the engine is less consumed for running the vehicle during warming up of the catalyst. Therefore, during warming up of the catalyst, the amount of gases (exhaust gases) produced by engine operation can be suppressed. Additionally, in case of a fuel cell vehicle equipped with a fuel cell, a reformer, and a catalyst purifying gases (specifically, CO) produced when taking hydrogen out by the reformer, for example, the electric power generated by the fuel cell is less consumed for running the vehicle during warming up of the catalyst. Thus, the amount of electric power generated by the fuel cell and the amount of hydrogen taken out by the reformer can be suppressed. Therefore, the amount of gases (specifically, CO) produced when taking hydrogen out can be suppressed. As a result, in either case, the control method of a vehicle can be provided, in which gas emission in an amount exceeding the purifying capability of the warming-up catalyst is prevented.

BRIEF DESCRIPTION OF THE DRAWINGS

FIGS. 4A and 4B are timing charts showing operating condition of a hybrid vehicle according to an embodiment of the present invention.

BEST MODES FOR CARRYING OUT THE INVENTION

Figure 1:
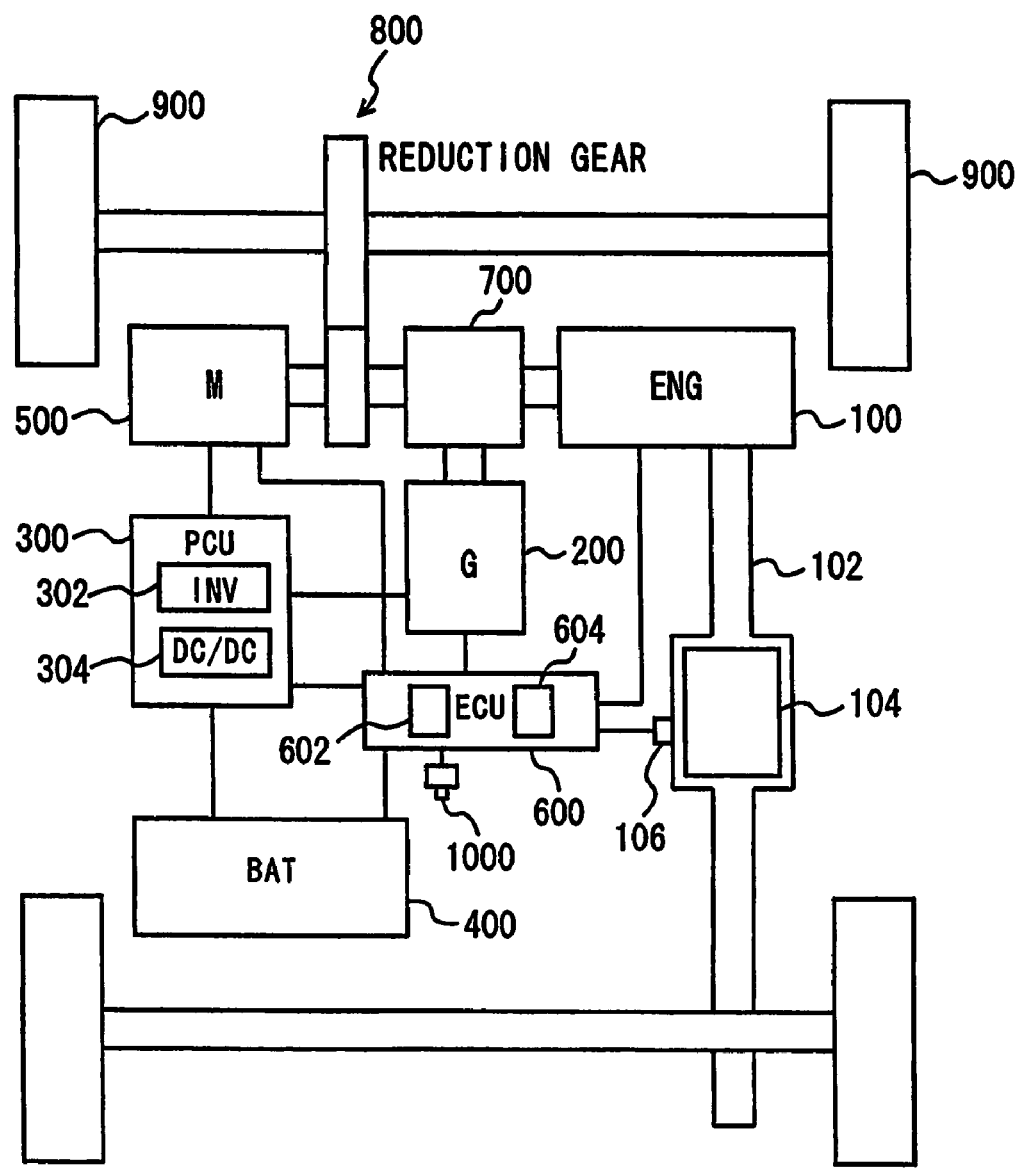
FIG. 1 is a control block diagram showing the configuration of a hybrid vehicle according to an embodiment of the present invention.

In the following, the embodiment of the present invention will be discussed referring to the drawings. The same parts are denoted by the same reference characters in the following. Their names and functions are also the same. Accordingly, detailed description thereof is not repeated.

Referring to FIG. 1, a hybrid vehicle according to the present embodiment includes: an engine 100; a generator 200; a power control unit 300; a battery 400; a motor 500; and a hybrid ECU (Electronic Control Unit) 600 connected to all of these components.

To engine 100, an exhaust pipe 102 discharging exhaust gases produced by combustion of fuel is connected. Exhaust pipe 102 is provided with a catalyst 104 purifying exhaust gases. Catalyst 104 is the one oxidizing hydrocarbon and/or carbon monoxide to be carbon dioxide and/or water, and reducing nitrogen oxides, i.e., a three-way catalyst. The catalyst 104 must be fully warmed to exert its purifying effect. As the temperature of catalyst 104 is low when engine 100 is started up after having stopped for a long period, it needs warming up for raising the temperature.

In the present embodiment, whether warming up of catalyst 104 is necessary or not is determined by catalyst temperature TC. To this end, a catalyst temperature sensor 106 is provided on exhaust pipe 102 in the vicinity of catalyst 104. Catalyst temperature sensor 106 is connected to hybrid ECU 600, and transmits a signal indicative of catalyst temperature TC to hybrid ECU 600. When catalyst temperature TC is lower than a predetermined temperature, it is determined that warming up of catalyst 104 is necessary.

It is noted that the determination of whether warming up of catalyst 104 is necessary or not may be determined by measuring the time elapsed since the startup of an ignition switch (not shown), water temperature of the engine, or the time elapsed since the startup of the system.

Additionally, while the hybrid vehicle according to the present embodiment includes engine 100 and catalyst 104, it may alternatively be structured to include, for example, a fuel cell, a reformer, and a catalyst purifying gases (specifically, CO) produced when taking hydrogen out by the reformer.

The motive power generated by engine 100 is divided into two routes by a power split mechanism 700. One is the route to drive wheels 900 through a reduction gear 800, and the other is the route to drive generator 200 to generate electric power.

Generator 200 generates electric power by the motive power of engine 100 divided by power split mechanism 700. The electric power generated by generator 200 is selectively used in accordance with driving state of the vehicle, SOC (State Of Charge) of battery 400. For example, when driving under normal condition or sudden acceleration, the electric power generated by generator 200 directly serves as electric power for driving motor 500. On the other hand, when SOC of battery 400 is lower than a predetermined value, the electric power generated by generator 200 is converted from alternating current to direct current by an inverter 302 of power control unit 300. Then, the voltage is adjusted by a converter 304, and thereafter the power is stored in battery 400.

Motor 500 is driven by at least one of the electric power stored in battery 400 and the electric power generated by generator 200. The drive power of motor 500 is transmitted to wheels 900 through reduction gear 800. Thus, motor 500 assists engine 100, or runs the vehicle by the drive power from motor 500.

On the other hand, when the hybrid vehicle is in a regenerative braking mode, motor 500 is driven by wheels 900 through reduction gear 800, and motor 500 operates as a generator. Thus, motor 500 serves as regenerative brake converting braking energy into electric power. The electric power generated by motor 500 is stored in battery 400 through inverter 302.

Hybrid ECU 600 includes CPU (Central Processing Unit) 602 and memory 604. CPU 602 operates based on vehicle's running state, how far the driver has depressed the acceleration pedal and the brake pedal, the position of the shift lever, SOC of battery 400, maps and programs stored in memory 604 and the like. Thus, hybrid ECU 600 runs the vehicle in either the EV running mode or the normal running mode, and controls equipments mounted on the vehicle to attain desired running state.

Here, the EV running mode refers to a driving mode to run the vehicle using only the drive power from motor 500 supplied with electric power from battery 400 while engine 100 is stopped, when an EV switch 1000 is turned on by the driver.

The normal running mode refers to a driving mode to run the vehicle using the drive power from at least one of engine 100 and motor 500, based on vehicle's running state, how far the driver has depressed the acceleration pedal and the brake pedal, the position of the shift lever, SOC of battery 400, catalyst temperature TC and the like. In this normal running mode, when catalyst temperature TC is lower than a predetermined temperature and it is determined that warming up of catalyst 104 is necessary, engine 100 is started and catalyst 104 is warmed up by exhaust gases emitted from the engine, and warming-up running is performed, in which the vehicle runs by the drive power from motor 500 supplied with electric power from battery 400.

Hybrid ECU 600 controls to run the hybrid vehicle in the EV running mode in accordance with the operation of the driver turning EV switch 1000 on, when SOC of battery 400 is greater than X %. On the other hand, when SOC of battery 400 becomes lower than Y (Y<X) % while running in the EV running mode, it prohibits the EV running mode and drives the vehicle in the normal running mode.

As above, only when SOC of battery 400 is greater than X %, it permits starting the EV running mode by EV switch 1000 turned on by the driver. Additionally, it prohibits continuation of the EV running mode if SOC of battery 400 becomes lower than Y % while running in the EV running mode. Thus, by employing two threshold values as permission and prohibition conditions of the EV running mode, it prevents permission and prohibition of the EV running mode from being frequently repeated.

When SOC of battery 400 further decreases during the hybrid vehicle is running to reach Z (Z<Y<) %, it is determined that electric power cannot be supplied from battery 400 to motor 500, and hybrid vehicle runs only by the drive power of engine 100 and without being supplied with electric power from battery 400. At this time, generator 200 is driven by engine 100, and electric power generated by generator 200 is stored in battery 400.

Here, the value (Y %) of SOC of battery 400 at which EV running mode is prohibited is set to a value whereby SOC of battery 400 may be decreased during the warming-up running but may not become lower than Z % at the end of warming up. Specifically, it is the value determined by an experiment, under which the hybrid vehicle performs various running patterns such as long-time parking, moderate acceleration, sudden acceleration and the like, thereby obtaining the decrease amount of SOC of battery 400 until the end of warming up, which is added to the lower limit value (Z %) with which battery 400 can supply electric power.

Thus, by setting SOC at which the EV running mode is prohibited, the EV running mode is prohibited such that SOC of battery 400 becomes the SOC that enables the warming-up running. In other words, when SOC of battery 400 is the SOC that enables the warming-up running, the EV running mode is permitted.

It should be noted that, while in the present embodiment two threshold values are used as the permission condition of the EV running mode, the number of the threshold values is not limited thereto and the threshold value may be one.

Figure 2:
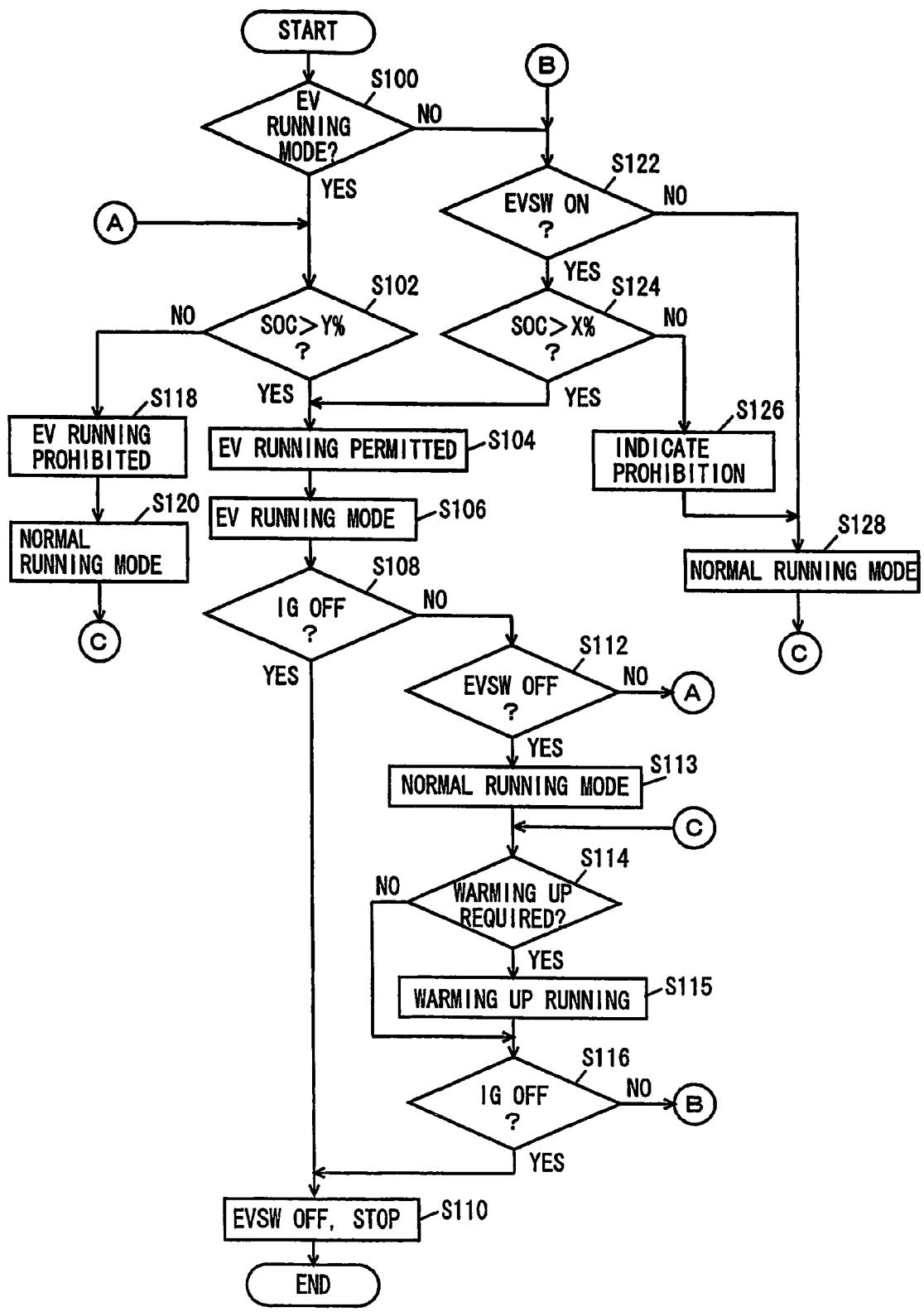
FIG. 2 is a flowchart showing control configuration of a program executed by a hybrid ECU.

Referring to FIG. 2, control configuration of the program executed by hybrid ECU 600 of the hybrid vehicle according to the present embodiment will be described.

At step (hereinafter "step" is referred to as "S") 100, hybrid ECU 600 determines whether the hybrid vehicle is currently running in the EV running mode or not. If it is running in the EV running mode (YES at S100), then the process goes to S102. Otherwise (NO at S100), the process goes to S122.

At S102, hybrid ECU 600 determines if SOC of battery 400 is greater than Y %. If SOC of battery 400 is greater than Y % (YES at S102), then the process goes to S104. Otherwise (NO at S102), the process goes to S118.

At S104, hybrid ECU 600 permits the EV running mode. At S106, hybrid ECU 600 runs the hybrid vehicle in the EV running mode (continues to run the vehicle in the EV running mode).

At S108, hybrid ECU 600 determines whether the ignition switch (not shown) is turned off or not. If ignition switch (not shown) is turned off (YES at S108), then the process goes to S110. Otherwise (NO at S108), the process goes to S112.

At S110, hybrid ECU 600 turns EV switch 1000 off and stops the operation of the hybrid vehicle.

At S112, hybrid ECU 600 determines whether EV switch 1000 is turned off or not. If EV switch 1000 is turned off (YES at S112), then the process goes to S113. Otherwise (NO at S112), the process goes back to S102.

At S113, hybrid ECU 600 runs the vehicle in the normal running mode.

At S114, hybrid ECU 600 determines whether warming up of catalyst 104 is necessary or not. The determination whether warming up of catalyst 104 is necessary or not is made based on catalyst temperature TC. If catalyst TC is lower than a predetermined value, then it is determined that warming up of catalyst 104 is necessary. If warming up of catalyst 104 is necessary (YES at S114), then the process goes to S115. Otherwise (NO at S114), the process goes to S116.

At S115, hybrid ECU 600 runs the hybrid vehicle in the warming-up running mode. Here, while engine 100 is driving, it is caused to operate in the steady state such that the amount of emitted exhaust gases does not exceed the purifying capability of warming-up catalyst 104. Additionally, the hybrid vehicle runs by motor 500 supplied with electricity by battery 400.

At S116, hybrid ECU 600 determines whether the ignition switch (not shown) is turned off or not. If the ignition switch is turned off (YES at S116), then the process goes to S110. Otherwise (NO at S116), the process goes to S122.

At S118, the hybrid ECU 600 prohibits the EV running mode. At S120, hybrid ECU 600 runs the hybrid vehicle in the normal running mode.

At S122, hybrid ECU 600 determines whether EV switch 1000 is turned on or not. If EV switch 1000 is turned on (YES at S122), then the process goes to S124. Otherwise (NO at S122), the process goes to S128.

At S124, hybrid ECU 600 determines whether SOC of battery 400 is greater than X % or not. If SOC of battery 400 is greater than X % (YES at S124), then the process goes to S104. Otherwise (NO at S124), the process goes to S126.

At S126, hybrid ECU 600 turns on an indicator lamp (not shown) inside the combination meter (not shown) to inform the driver that the EV running mode is prohibited. It is noted that the method for informing the driver that the EV running mode is prohibited is not limited thereto, and prohibition of the EV running mode may be indicated on a display on the dashboard or on a display of a car navigation system.

At S128, hybrid ECU 600 runs the hybrid vehicle in the normal running mode (continues the normal running mode).

In the following, the operation of the hybrid vehicle equipped with hybrid ECU 600 based on the configuration and the flowchart as discussed above will be described for each case where battery SOC is greater than X % and where it is smaller than X %.

[When SOC of Battery is Greater than X %]

Assume that the hybrid vehicle is currently running in the normal running mode. In this case, it is determined that it is not in the EV running mode (NO at S100), and it is determined whether EV switch 1000 is turned on or not (S122). If EV switch is turned on (YES at S122), then it is determined whether SOC of battery 400 is greater than X % or not (S124). Since SOC of battery 400 is greater than X % now (YES at S124), the EV running mode is permitted (S104), and the hybrid vehicle runs in the EV running mode (S106). This EV running mode is terminated by turning off the ignition switch (not show) (YES at S108), or by turning off EV switch 1000 (YES at S112).

Figure 3A:
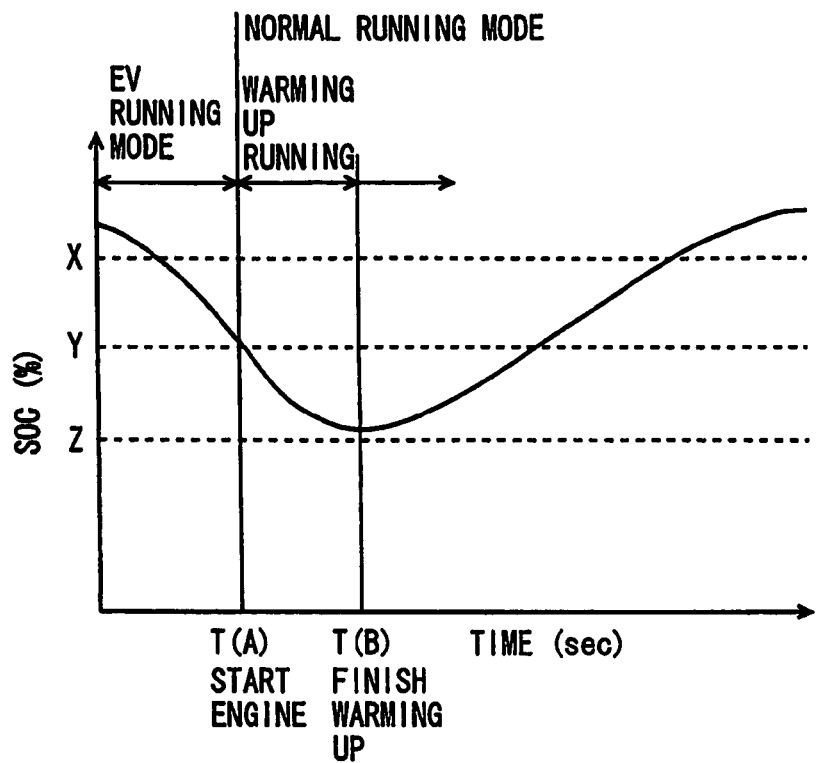
FIGS. 3A and 3B are timing charts showing operating condition of a hybrid vehicle according to an embodiment of the present invention.

While running in the EV running mode, as shown in FIG. 3A, if SOC of battery 400 falls from the value greater than X % to the value smaller than Y % (NO at S102), then the EV running mode is prohibited (S118), and the hybrid vehicle runs in the normal running mode (S120). If running in the normal running mode (S120), then it is determined whether warming up of catalyst 104 is necessary or not (S114). If warming up of catalyst 104 is necessary (YES at S114), then engine 100 is started and catalyst 104 is warmed by exhaust gases, and the warming-up running in which the hybrid vehicle runs by the drive power of motor 500 supplied with electric power from battery 400 is executed (S115). While running in the warming-up running mode, as electric power is discharged from battery 400, SOC of battery 400 decreases as shown in FIG. 3A. However, warming up of catalyst 104 completes before SOC of battery 400 becomes smaller than Z %. As the amount of exhaust gases that can be purified increases when warming up is finished, the output of engine 100 can be increased to run the vehicle by the drive power from engine 100 and battery 400 can be charged by driving generator 200, SOC of battery 400 increases.

Thus, as the EV running mode is prohibited if SOC of battery 400 becomes smaller than Y %, SOC of battery 400 can be prevented from decreasing to be smaller than Z % even when driving in the warming-up running mode. It prevents the situation that motor 500 cannot be operated supplied with electric power from battery 400, due to SOC of battery 400 becoming smaller than Z % during warming up of catalyst 104. Accordingly, it is not necessary to consume the output of engine 100 for running the vehicle during the warming up running, and thus output of engine 100 is suppressed. As a result, emission of exhaust gases in an amount exceeding purifying capability of the warming up catalyst can be prevented.

Figure 3B:
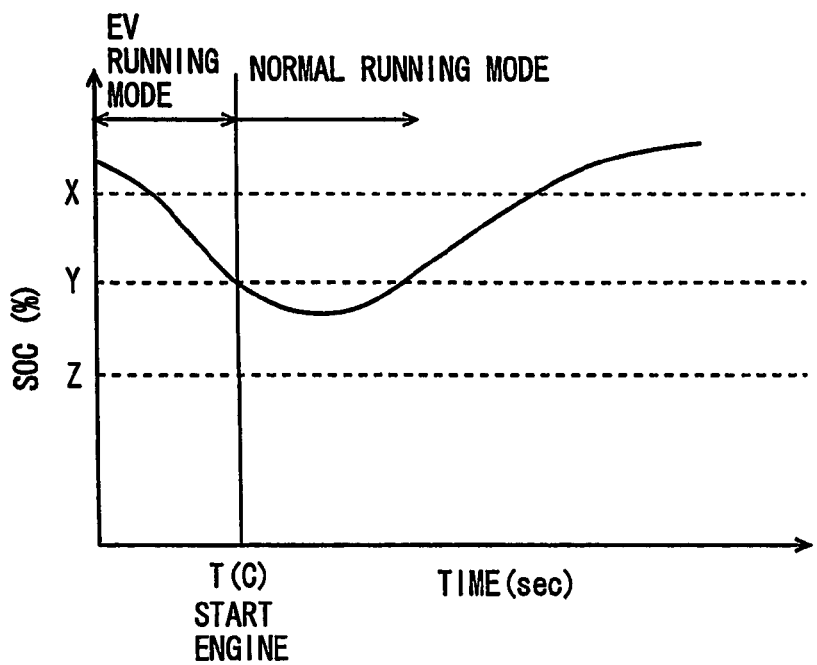

When warming up of the catalyst is not necessary (NO at S114), the warming-up running is not performed, and engine 100 is started, whereby the hybrid vehicle runs by the drive power from engine 100, and generator 200 operates to charge battery 400. Accordingly, as shown in FIG. 3B, at the time point where SOC of battery 400 becomes smaller than Y %, charging of battery 400 is started.

[When SOC of Battery is Smaller than X %]

Assume that the hybrid vehicle is currently running in the normal running mode. In this case, it is determined that it is not running in the EV running mode (NO at S100), and it is determined whether EV switch 1000 is turned on or not (S122). If the EV switch is turned on (YES at S122), then it is determined whether SOC of battery 400 is greater than X % or not (S124). Since SOC of battery 400 is now smaller than X % (NO at S124), the indicator lamp (not shown) inside the combination meter (not shown) is turned on to inform the driver that the EV running mode is prohibited (S126), and the hybrid vehicle runs in the normal running mode (S128).

If the hybrid vehicle runs in the normal driving mode (S128), it is determined whether warming up of catalyst 104 is necessary or not (S114). If warming up of the catalyst is necessary (YES at S114), then engine 100 is started and catalyst 104 is warmed up, and the warming-up running mode in which the hybrid vehicle runs by the drive power of motor 500 supplied with electric power from battery 400 is executed (S115). While running in the warming-up running mode, as electric power is discharged from battery 400, SOC of battery 400 decreases as shown in FIG. 4A. However, warming up of catalyst 104 completes before SOC of battery 400 becomes smaller than Z %. As the amount of exhaust gases that can be purified increases when warming up is finished, the output of engine 100 can be increased to run the vehicle by the drive power from engine 100 and battery 400 can be charged by driving generator 200, SOC of battery 400 increases.

When warming up of the catalyst is not necessary (NO at S114), the warm-up running (S115) is not executed, and the output of engine 100 is increased to run the vehicle by the drive power from engine 100 and generator 200 is driven to charge battery 400. Accordingly, as shown in FIG. 4B, battery 400 is charged simultaneously with startup of engine 100.

As above, the hybrid ECU of the hybrid vehicle according to the present embodiment prohibits the EV running mode such that SOC necessary for performing the warming-up running is maintained. Thus, as running of vehicle or assistance of engine by the motor supplied with electric power from the battery may be attained when warming-up of the catalyst is required, the output of the engine will not excessively be consumed for running the vehicle. Accordingly, the output of the engine can be suppressed. As a result, gas emission in an amount exceeding the purifying capability of a warming-up catalyst can be prevented.

It is noted that the catalyst requiring warming up includes a catalyst purifying gases emitted from a reformer for reforming hydrocarbon-based fuel into hydrogen gases to be supplied to an engine or a fuel cell.

It is clearly understood that the embodiment disclosed hereinabove is by way of illustration and example only and is not to be taken by way of limitation. The scope of the present invention is limited only by the scope of the claims and not by the description of the embodiment. It is intended that all modifications in equivalent terms to the claims and within the scope of the claims are included.

The invention claimed is:

1. A control apparatus of a vehicle equipped with an engine generating drive power, an electric motor generating drive power, a charging mechanism supplying electric power to the electric motor, and a catalyst purifying gases emitted from the engine, comprising:

a switch to be operated by a driver for running the vehicle only by the electric motor supplied with electric power from the charging mechanism;

first control means for running the vehicle only by the electric motor supplied with electric power from the charging mechanism under conditions that the switch is turned on;

determination means for determining whether the catalyst requires to be warmed up or not;

second control means for running the vehicle by the electric motor supplied with electric power from the charging mechanism and operating the engine to warm up the catalyst with exhaust gases emitted from the engine, when it is determined that the catalyst requires to be warmed up; and prohibition means for prohibiting control by the first control means when a remaining amount of electric power of the charging mechanism is smaller than an amount which is determined by adding: (i) a lower limit value with which the charging mechanism can supply electric power to the electric motor to (ii) a decrease amount by which the electric power of the charging mechanism will be decreased at an end of the warming up by the second control means.

2. The control apparatus of a vehicle according to claim 1, further comprising information means for informing the driver that control by the first control means is prohibited, when control by the first control means is prohibited.

3. A control apparatus of a vehicle equipped with an engine generating drive power, an electric motor generating drive power, a charging mechanism supplying electric power to the electric motor, and a catalyst purifying gases emitted from the engine, comprising:

a switch to be operated by a driver for running the vehicle only by the electric motor supplied with electric power from the charging mechanism;

a first control unit running the vehicle only by the electric motor supplied with electric power from the charging mechanism under conditions that the switch is turned on;

a determination unit determining whether the catalyst requires to be warmed up or not;

a second control unit running the vehicle by the electric motor supplied with electric power from the charging mechanism and operating the engine to warm up the catalyst with exhaust gases emitted from the engine, when it is determined that the catalyst requires to be warmed up; and a prohibition unit prohibiting control by the first control unit when a remaining amount of electric power of the charging mechanism is smaller than an amount which is determined by adding: (i) a lower limit value with which the charging mechanism can supply electric power to the electric motor to (ii) a decrease amount by which the electric power of the charging mechanism will be decreased at an end of the warming up by the second control unit.

4. The control apparatus of a vehicle according to claim 3, further comprising an information unit informing the driver that control by the first control unit is prohibited when control by the first control unit is prohibited.

5. A control method of a vehicle equipped with an engine generating drive power, an electric motor generating drive power, a charging mechanism supplying electric power to the electric motor, a catalyst purifying gases emitted from the engine, and a switch to be operated by a driver for running the vehicle only by the electric motor supplied with electric power from the charging mechanism, comprising:

a step of running the vehicle only by the electric motor supplied with electric power from the charging mechanism under conditions that the switch is turned on;

a step of determining whether the catalyst requires to be warmed up or not;

a step of running the vehicle by the electric motor supplied with electric power from the charging mechanism and operating the engine to warm up the catalyst with exhaust gases emitted from the engine, when it is determined that the catalyst requires to be warmed up; and a step of prohibiting control by the step of running the vehicle only by the electric motor supplied with electric power from the charging mechanism under conditions that the switch is turned on, when a remaining amount of electric power of the charging mechanism is smaller than an amount which is determined by adding: (i) a lower limit value with which the charging mechanism can supply electric power to the electric motor to (ii) a decrease amount by which the electric rower of the charging mechanism will be decreased at an end of the warming up.

6. The control method of a vehicle according to claim 5, further comprising a step of informing the driver that control by the step of running the vehicle only by the electric motor supplied with electric power from the charging mechanism under conditions that the switch is turned on is prohibited, when control by the step of running the vehicle only by the electric motor supplied with electric power from the charging mechanism under conditions that the switch is turned on is prohibited.

* * * * *